US009693669B2

(12) United States Patent
Boyer

(10) Patent No.: US 9,693,669 B2
(45) Date of Patent: Jul. 4, 2017

(54) DISHWASHER APPLIANCE HAVING BACKFLOW DEVICE

(71) Applicant: General Electric Company, Schenectady, NY (US)

(72) Inventor: Joel Charles Boyer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 207 days.

(21) Appl. No.: 14/532,274

(22) Filed: Nov. 4, 2014

(65) Prior Publication Data

US 2016/0120390 A1 May 5, 2016

(51) Int. Cl.
*A47L 15/42* (2006.01)
*C02F 1/00* (2006.01)

(52) U.S. Cl.
CPC ....... *A47L 15/4208* (2013.01); *A47L 15/4219* (2013.01); *C02F 1/001* (2013.01); *A47L 15/4206* (2013.01); *C02F 2307/12* (2013.01)

(58) Field of Classification Search
CPC ........ A47L 15/4202–15/4208; A47L 15/4221; B01D 35/153
See application file for complete search history.

(56) References Cited

U.S. PATENT DOCUMENTS

2009/0178719 A1* 7/2009 Matsuo ................... F16K 31/22
                                                        137/409

FOREIGN PATENT DOCUMENTS

CA            2190936 A1    5/1997

* cited by examiner

*Primary Examiner* — Michael Barr
*Assistant Examiner* — Spencer Bell
(74) *Attorney, Agent, or Firm* — Dority & Manning, P.A.

(57) ABSTRACT

A filter assembly for a dishwasher appliance is provided including a first filter, a second filter, and a backflow device. The backflow device is positioned within the second filter and movably attached to the second filter, such that backflow device is movable between an open position and a closed position. When in the closed position, the backflow device prevents a flow of fluid through an inlet of the second filter.

14 Claims, 6 Drawing Sheets

DISHWASHER APPLIANCE HAVING BACKFLOW DEVICE

FIELD OF THE INVENTION

The present subject matter relates generally to dishwasher appliances and more particularly to filter assemblies for dishwasher appliances.

BACKGROUND OF THE INVENTION

During wash and rinse cycles, dishwasher appliances generally circulate a fluid through a wash chamber over articles, such as pots, pans, silverware, etc. The fluid can be, e.g., various combinations of water and detergent during the wash cycle or water (which may include additives) during the rinse cycle. Typically, the fluid is circulated during a given cycle using a pump. Fluid is collected at or near the bottom of the wash chamber and pumped back into the wash chamber through, e.g., nozzles in spray arms and other openings that direct the fluid against the articles to be cleaned or rinsed.

Depending upon the level of soil on the articles, fluids used during wash and rinse cycles will become contaminated with soils in the form of debris or particles that are carried with the fluid. In order to protect the pump and recirculate the fluid through the wash chamber, it is beneficial to filter the fluid so that relatively clean fluid is applied to the articles in the wash chamber and materials are removed or reduced from the fluid supplied to the pump.

Accordingly, dishwasher appliances are generally provided with a filter assembly to trap at least certain of the soils carried with the wash fluid. Such filter assemblies are generally fluidly connected with the pump, such that the fluid circulated by the pump is relatively clean. In certain dishwasher appliances, the pump pressurizes the filtered fluid and provides the pressurized fluid through various conduits to the spray arms position within the dishwasher appliance. At the end of a wash cycle, however, the pump stops providing pressurized fluid through various conduits. At such time, the weight of the fluid positioned in the conduits may cause a reversal of the flow through the pump. Such a reversal in the flow of fluid through the pump can also be directed back through the filter assembly, carrying soils previously trapped during operation back into the wash chamber of the dishwasher appliance.

Accordingly, a dishwasher appliance capable of preventing previously trapped soils from traveling back into the wash chamber would be beneficial. More particularly, a filter assembly capable of deterring a reverse flow of fluid through the filter assembly would be particularly useful.

BRIEF DESCRIPTION OF THE INVENTION

Aspects and advantages of the invention will be set forth in part in the following description, or may be apparent from the description, or may be learned through practice of the invention.

In a first exemplary embodiment a dishwasher appliance is provided defining a vertical direction. The dishwasher appliance includes a tub defining a wash chamber, a sump positioned at a bottom portion of the tub along the vertical direction, and a filter assembly disposed within the sump. The filter assembly includes a first filter, a second filter defining an inlet, and a backflow device. The backflow device is positioned within the second filter and is moveable relative to the inlet of the second filter between an open position and a closed position. The backflow device allows fluid flow through the inlet of the second filter when in the open position and prevents fluid flow through the inlet of the second filter when in the closed position.

In a second exemplary embodiment, a filter assembly for a dishwasher appliance is provided. The filter assembly includes a first filter, a second filter defining an inlet, and a backflow device. The backflow device is positioned within the second filter and is slidably attached to the second filter. The backflow device moveable relative to the inlet of the second filter between an open position and a closed position. The backflow device allows fluid flow through the inlet of the second filter when in the open position and prevents fluid flow through the inlet of the second filter when in the closed position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
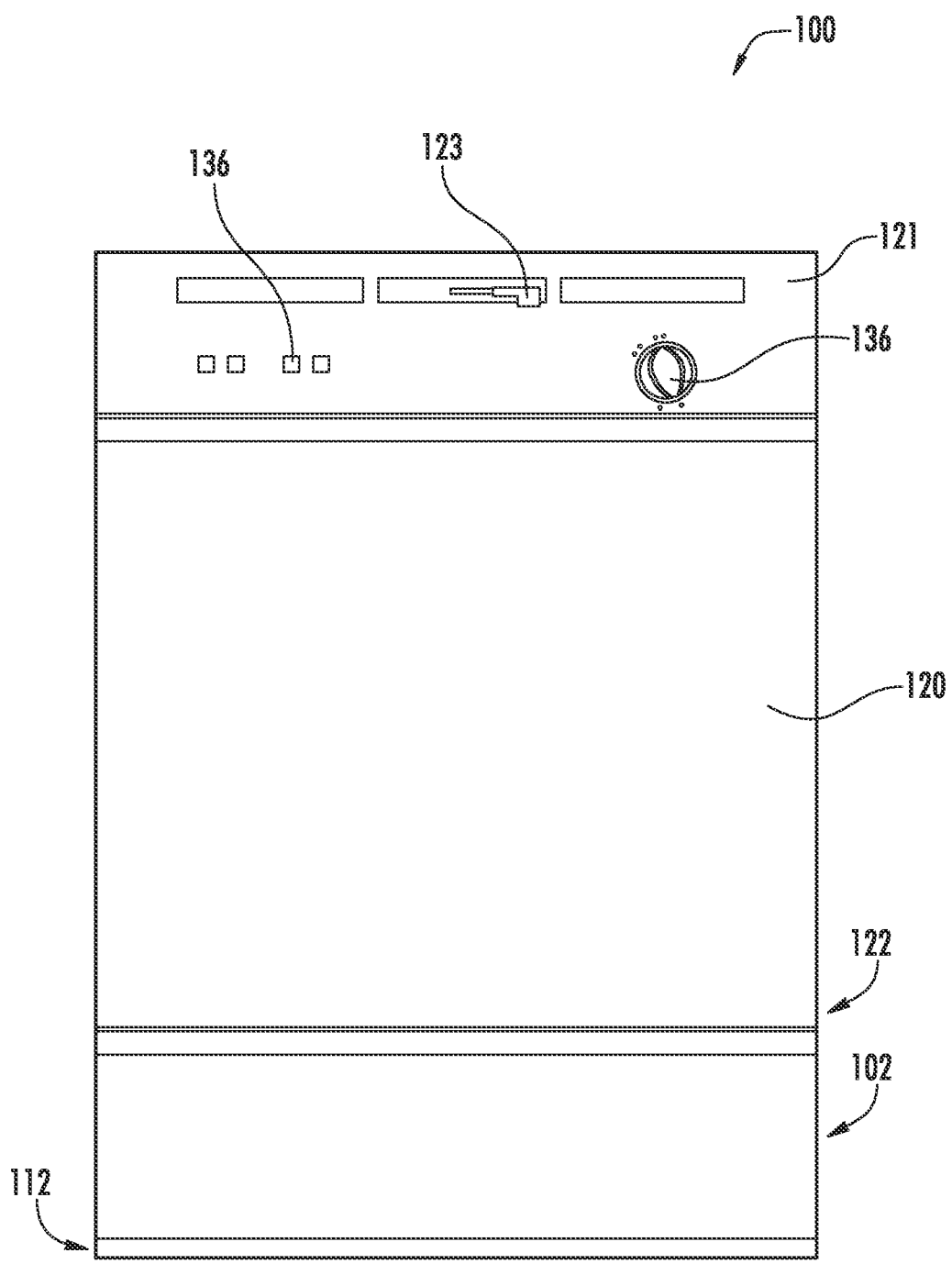
FIG. 1 provides a front elevation view of a dishwasher appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
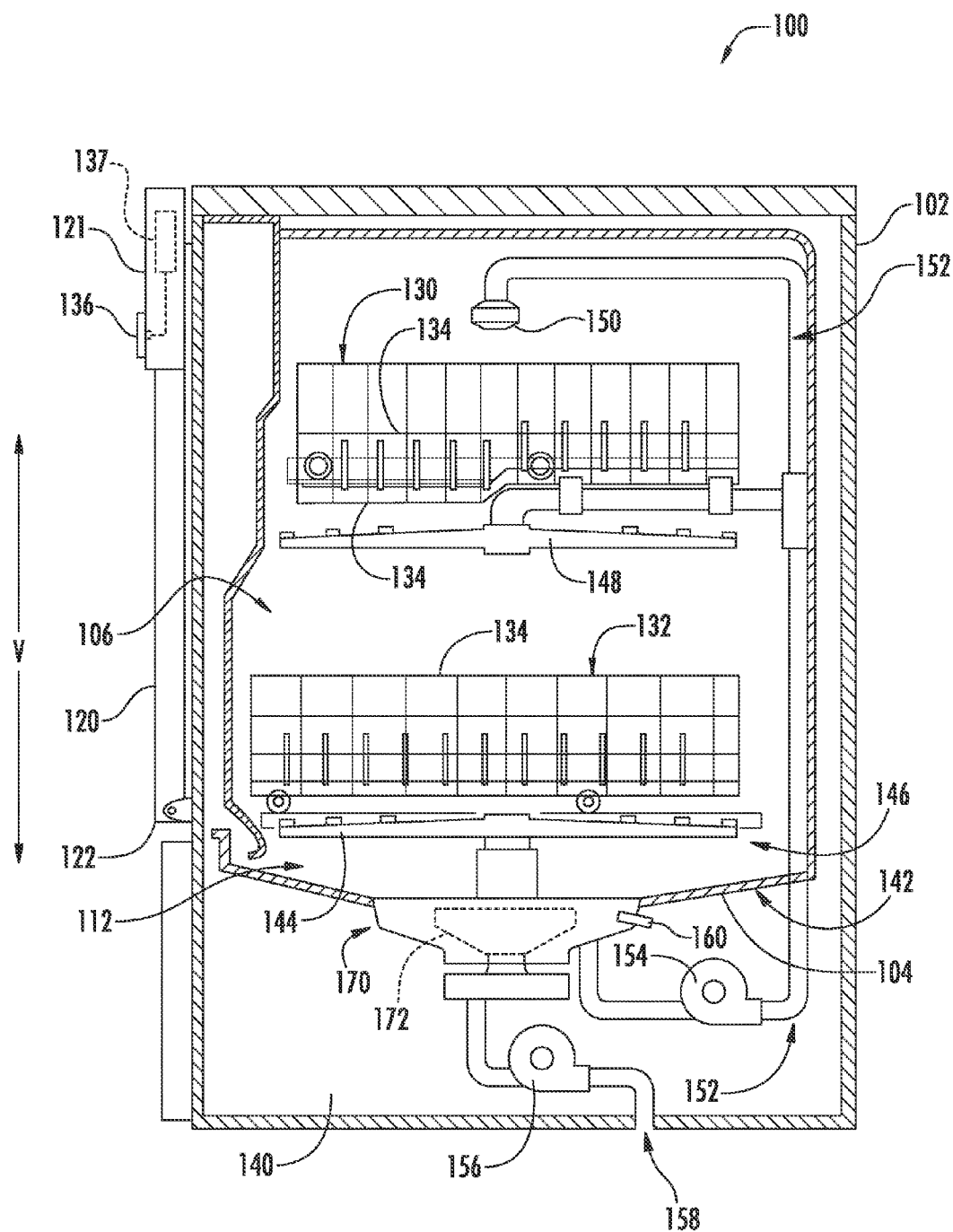
FIG. 2 provides a side, section view of the exemplary dishwasher appliance of FIG. 1.

FIGS. 1 and 2 depict a dishwasher appliance 100 according to an exemplary embodiment of the present subject matter. FIG. 1 provides a front view of the exemplary dishwasher appliance 100, and FIG. 2 provides a side, cross-sectional view of the exemplary dishwasher appliance 100.

As shown, dishwasher appliance 100 defines a vertical direction V and includes a cabinet 102. Cabinet 102 has a tub 104 therein that defines a wash compartment 106. The tub 104 also defines a front opening (not shown). Dishwasher appliance 100 includes a door 120 hinged at a bottom 122 of door 120 for movement between a normally closed, vertical position (shown in FIGS. 1 and 2), wherein wash compartment 106 is sealed shut for washing operation, and a horizontal, open position for loading and unloading of articles from dishwasher appliance 100. Latch 123 is used to lock and unlock door 120 for access to wash compartment 106. Tub 104 also includes a sump assembly 170 positioned adjacent a bottom portion 112 of tub 104 and configured for receipt of a liquid wash fluid (e.g., water, detergent, wash fluid, and/or any other suitable fluid) during operation of dishwasher appliance 100. Exemplary dishwasher appliance 100 further includes a filter 172 (shown in phantom) positioned in sump assembly 170.

A spout 160 is positioned adjacent sump assembly 170 of dishwasher appliance 100. Spout 160 is configured for directing liquid into sump assembly 170. Spout 160 may receive liquid from, e.g., a water supply (not shown) or any other suitable source. In alternative embodiments, spout 160 may be positioned at any suitable location within dishwasher appliance 100, e.g., such that spout 160 directs liquid into tub 104. Spout 160 may include a valve (not shown) such that liquid may be selectively directed into tub 104. Thus, for example, during the cycles described below, spout 160 may selectively direct water and/or wash fluid into sump assembly 170 as required by the cycle of dishwasher appliance 100.

Rack assemblies 130 and 132 are slidably mounted within wash compartment 106. Each of the rack assemblies 130 and 132 is fabricated into lattice structures including a plurality of elongated members 134. Each rack of the rack assemblies 130 and 132 is adapted for movement between an extended loading position (not shown) in which the rack is substantially positioned outside the wash compartment 106, and a retracted position (shown in FIGS. 1 and 2) in which the rack is located inside the wash compartment 106. A silverware basket (not shown) may be removably attached to rack assembly 132 for placement of silverware, utensils, and the like, that are otherwise too small to be accommodated by the racks 130 and 132.

Dishwasher appliance 100 further includes a lower spray assembly 144 that is rotatably mounted within a lower region 146 of the wash compartment 106 and above sump assembly 170 so as to rotate in relatively close proximity to rack assembly 132. A mid-level spray assembly 148 is located in an upper region of the wash compartment 106 and may be located in close proximity to upper rack 130. Additionally, an upper spray assembly 150 may be located above the upper rack 130.

The lower and mid-level spray assemblies 144 and 148 and the upper spray assembly 150 are fed by a fluid circulation assembly 152 for circulating water and dishwasher fluid in the tub 104. Fluid circulation assembly 152 may include a wash or recirculation pump 154 and a cross-flow/drain pump 156 located in a machinery compartment 140 located below sump assembly 170 of the tub 104, as generally recognized in the art. Cross-flow/drain pump 156 is configured for urging wash fluid within sump assembly 170 out of tub 104 and dishwasher appliance 100 to a drain 158. Wash pump 154 is configured for supplying a flow of wash fluid from sump assembly 170 to spray assemblies 144, 148 and 150 via a plurality of conduits (not labeled).

Each spray assembly 144 and 148 includes an arrangement of discharge ports or orifices for directing wash fluid onto dishes or other articles located in rack assemblies 130 and 132. The arrangement of the discharge ports in spray assemblies 144 and 148 provides a rotational force by virtue of wash fluid flowing through the discharge ports. The resultant rotation of the lower spray assembly 144 provides coverage of dishes and other dishwasher contents with a spray of wash fluid.

Dishwasher appliance 100 is further equipped with a controller 137 (shown in phantom) to regulate operation of the dishwasher appliance 100. Controller 137 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 137 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 137 may be positioned in a variety of locations throughout dishwasher appliance 100. In the illustrated embodiment, controller 137 may be located within a control panel area 121 of door 120 as shown. In such an embodiment, input/output ("I/O") signals may be routed between the control system and various operational components of dishwasher appliance 100 along wiring harnesses that may be routed through the bottom 122 of door 120. Typically, controller 137 includes a user interface 136 through which a user may select various operational features and modes and monitor progress of the dishwasher appliance 100. In one embodiment, user interface 136 may represent a general purpose I/O ("GPIO") device or functional block. Additionally or alternatively, user interface 136 may include input components, such as one or more of a variety of electrical, mechanical or electro-mechanical input devices including rotary dials, push buttons, and touch pads. User interface 136 may include a display component, such as a digital or analog display device designed to provide operational feedback to a user. User interface 136 may be in communication with controller 137 via one or more signal lines or shared communication busses.

It should be appreciated that the subject matter disclosed herein is not limited to any particular style, model or configuration of dishwasher appliance, and that the embodiment depicted in FIGS. 1 and 2 is for illustrative purposes only. For example, instead of the racks 130 and 132 depicted in FIG. 1, dishwasher appliance 100 may be of a known configuration that utilizes drawers that pull out from the cabinet and are accessible from the top for loading and unloading of articles.

Figure 3:
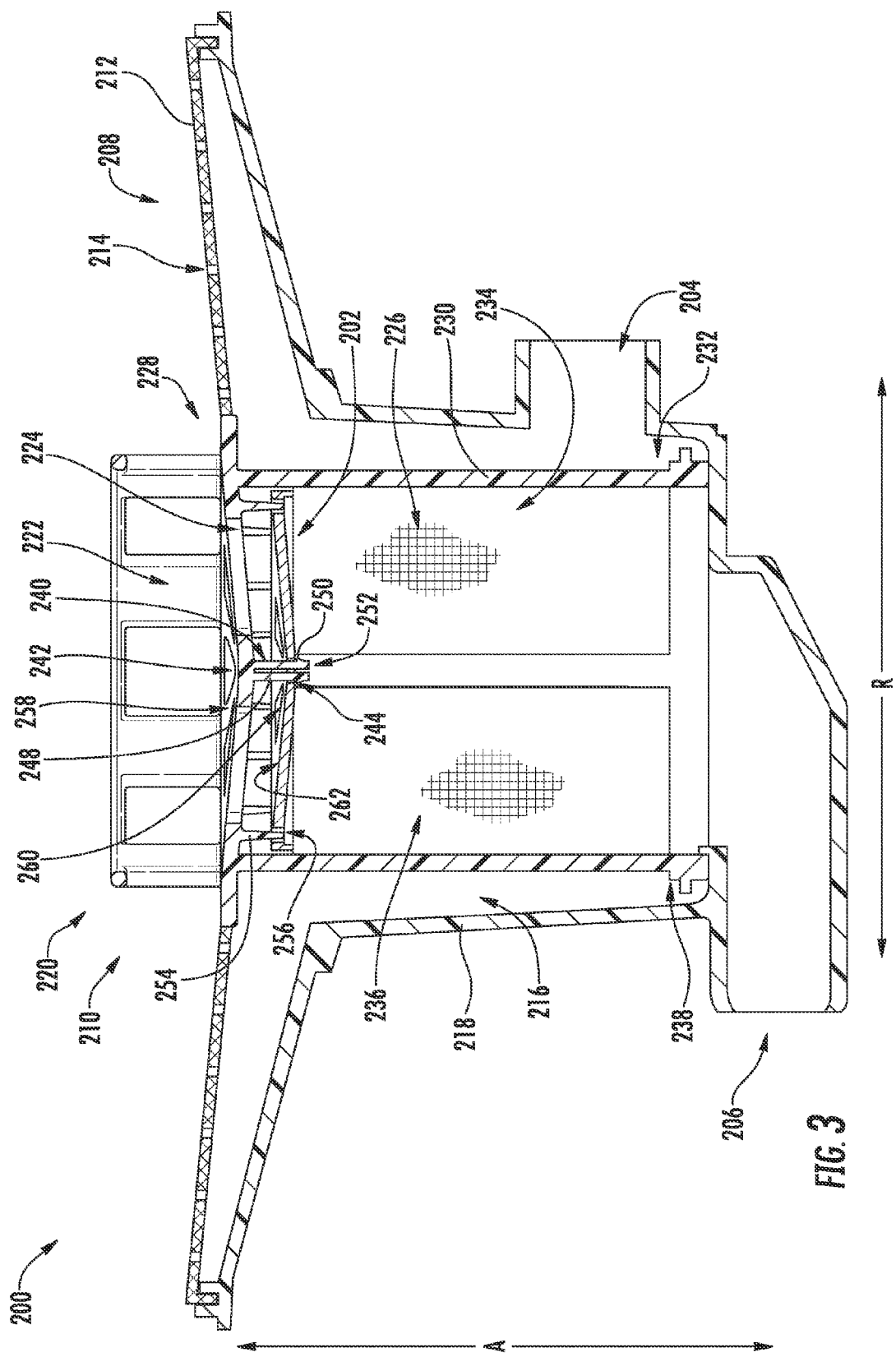
FIG. 3 provides a side, cross-sectional view of a filter assembly in accordance with an exemplary embodiment of the present disclosure, with a backflow device in an open position.
Figure 4:
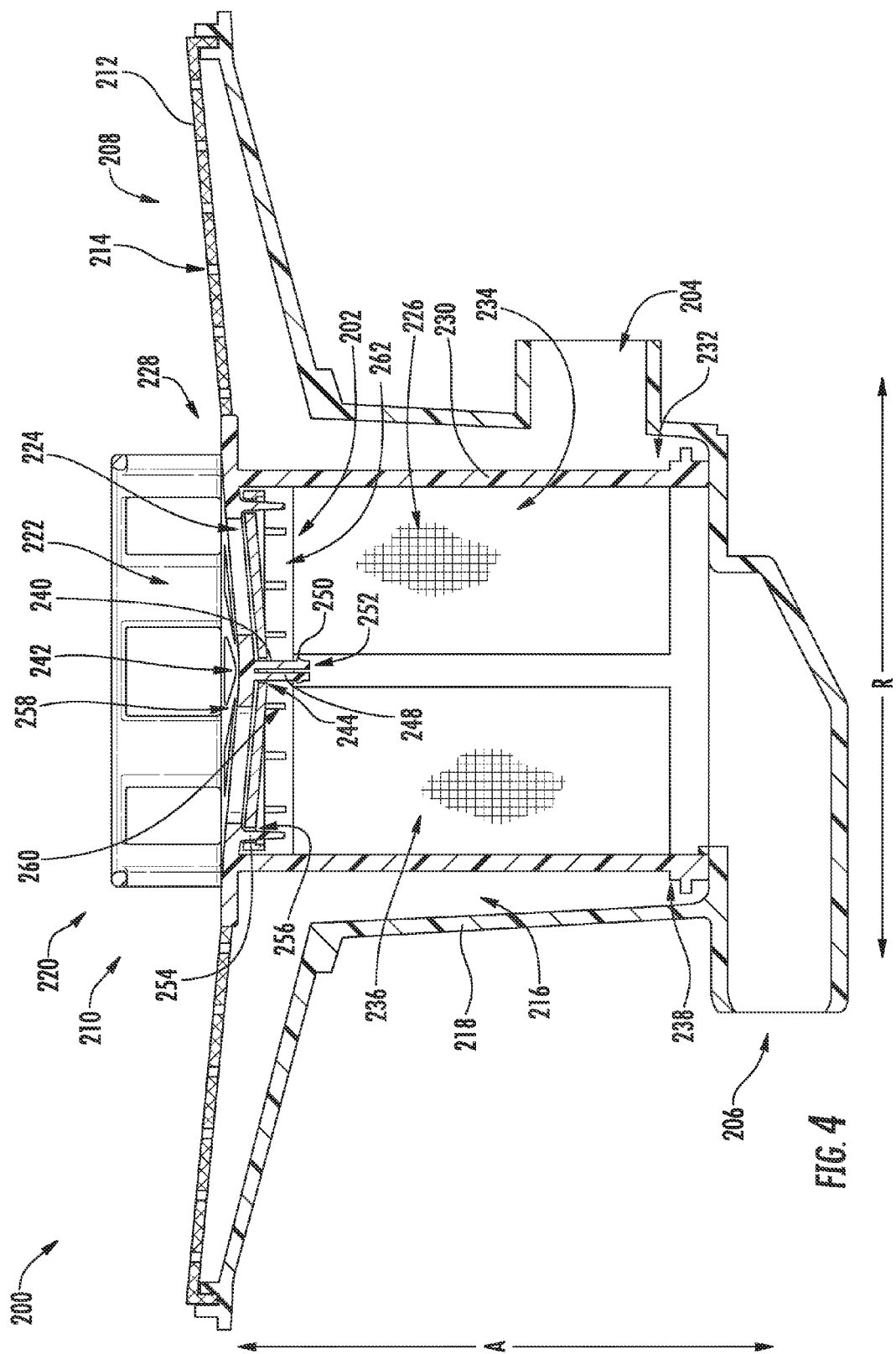
FIG. 4 provides a side, cross-sectional view of the exemplary filter assembly of FIG. 3, with the backflow device and a closed position.

Referring now to FIGS. 3 and 4, a filter assembly 200 according to an exemplary embodiment of the present subject matter is provided. More specifically, FIG. 3 provides a side, cross-sectional view of filter assembly 200 with a backflow device 202 in an open position, and FIG. 4 provides a side, cross-sectional view of filter assembly 200 with backflow device 202 in a closed position.

Filter assembly 200 may be used in any suitable dishwasher appliance. For example, filter assembly 200 may be used in exemplary dishwasher appliance 100 (FIG. 2), e.g., as filter 172 positioned in sump assembly 170. In such an embodiment, filter assembly 200 may be fluidly connected to wash chamber 106 and sump assembly 170, as well as to wash pump 154 and drain pump 156. As shown, filter assembly 200 includes a circulation port 204, which may fluidly connect filter assembly 200 to circulation assembly 152 (or more particularly to wash pump 154), and a drain port 206, which may fluidly connect filter assembly 200 to drain pump 156.

Figure 5:
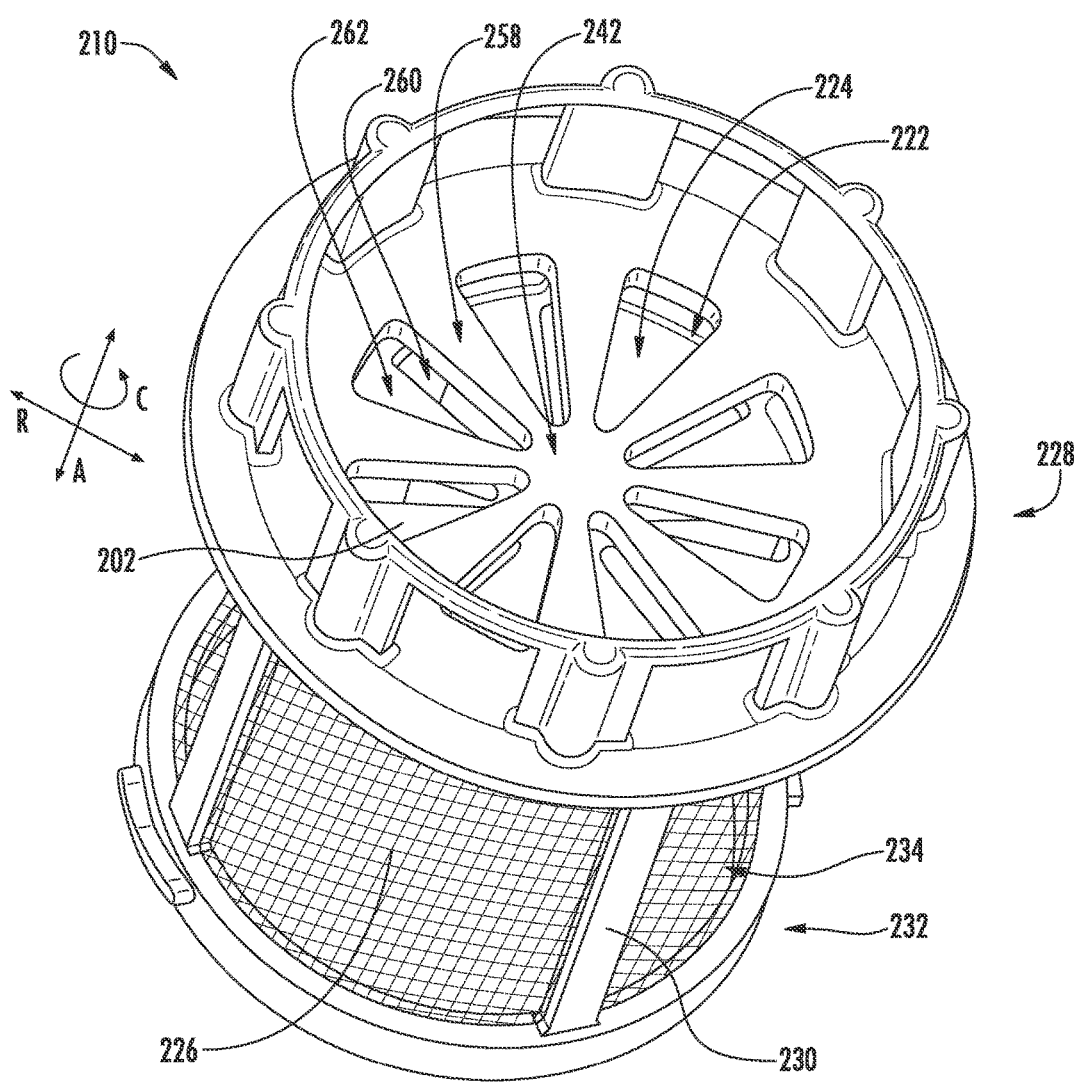
FIG. 5 provides a perspective view of a fine filter in accordance with an exemplary embodiment of the present disclosure.
Figure 6:
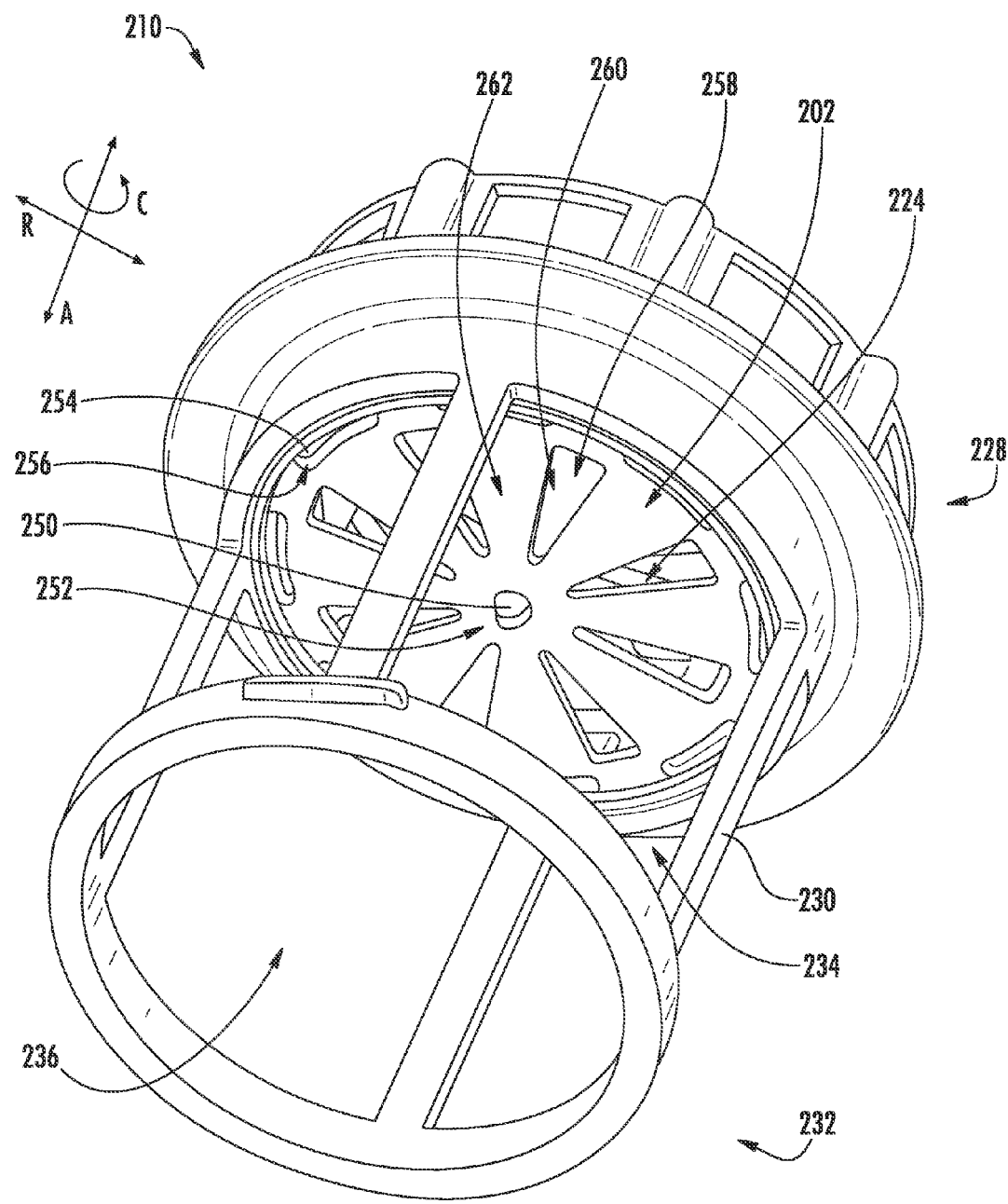
FIG. 6 provides another perspective view of the fine filter of FIG. 5.

Referring still to FIGS. 3 and 4, filter assembly 200 defines an axial direction A, a radial direction R, and a circumferential direction C (see FIGS. 5 and 6). Additionally, filter assembly 200 generally includes a first filter extending substantially along the radial direction R, a second filter extending substantially along the axial direction A, and backflow device 202. For the embodiment depicted, the first filter is a course filter 208 and the second filter is a fine filter 210. However, in other exemplary embodiments, first filter may instead be a fine filter and second filter may instead be a coarse filter. When positioned in the exemplary dishwasher appliance 100 of FIG. 2, the axial direction A may be parallel to the vertical direction V and the radial direction R may be parallel to a horizontal direction. Accordingly, in certain embodiments, the first filter, or course filter 208, may extend substantially along a horizontal direction and the second filter, or fine filter 210, may extend substantially along the vertical direction V.

Course filter 208 includes a plate 212 with a plurality of openings 214. Coarse filter 208 allows fluid to pass through the plurality of openings 214 into an annular passage 216 defined by a circumferential wall 218 of the filter assembly 200. Annular passage 216 extends around fine filter 210 and opens into wash port 204. By contrast, however, coarse filter 208 prevent objects, such as debris or other particles, greater than a maximum allowable size from passing through the plurality of openings 214. Accordingly, course filter 208 may prevent such debris or other particles from flowing into, e.g., wash pump 154 and spray assemblies 144, 148, 150. The maximum allowable size may correspond to a maximum size of debris the wash pump 154 and/or spray assemblies 144, 148, 150 can accommodate. Notably, coarse filter 208 additionally defines a slope along the axial direction A towards a center portion 220, such that debris or other particles larger than the maximum allowable size may be washed inwardly along the radial direction R towards center portion 220 and, as discussed below, towards fine filter 210.

Positioned in a parallel flow configuration with coarse filter 208, fine filter 210 is also configured to receive fluid from wash chamber 106. More particularly, fluid from wash chamber 106 may travel through either coarse filter 208 to wash port 204 or through fine filter 210 to wash port 204. Fine filter 210 defines an inlet 222 with one or more openings 224 and a filter medium 226. For the embodiment depicted, inlet 222 of fine filter 210 is positioned at a top end 228 of fine filter 210 along the axial direction A and is in approximately the same plane as coarse filter 208. It should be appreciated that as used herein, terms of approximation, such as "approximately" or "substantially," refer to being within a ten percent margin of error. Moreover, for the embodiment depicted, the one or more openings 224 in inlet 222 of fine filter 210 may accommodate debris and other particles larger than the plurality of openings in course filter 206.

Referring still to the exemplary filter assembly 200 of FIGS. 3 and 4, filter medium 226 of fine filter 210 is configured as a fine mesh material extending around fine filter 210 in the circumferential direction C. More particularly, for the embodiment depicted, fine filter 210 includes four posts 230 extending along the axial direction A from top end 228 to a bottom end 232 with four windows 234 defined therebetween. Filter medium 226 covers the windows 234, extending between the posts 230 along the circumferential direction C and between the top and bottom ends 228, 232 along the along the axial direction A. It should be appreciated, however, that in other exemplary embodiments, fine filter 210 may instead include any other suitable filter medium 226 as well as any other suitable support structure.

Fine filter 210 further defines a compartment 236 positioned downstream of inlet 222, or more particularly, between inlet 222 and filter medium 226. For the embodiment depicted, compartment 236 of fine filter 210 is in direct fluid communication with drain port 206 of filter assembly 200 and is configured to hold debris and other particles too large to pass through coarse filter 208 and filter medium 226 of fine filter 210. For example, in certain exemplary aspects, during a wash cycle of dishwasher appliance 100, wash pump 154 may provide for a flow of fluid from wash chamber 106 and through filter assembly 200 (and wash port 204). Debris and other particles filtered from wash fluid may be contained within compartment 236 of fine filter 210. Subsequent to such a wash cycle, drain pump 156 may activate and the debris and other particles contained within compartment 236 may be disposed of via a drain pipe (not shown) along with the wash fluid.

Accordingly, during a wash cycle of the exemplary dishwasher appliance 100, filter assembly 200 defines a normal flow direction in which fluid flows from wash chamber 106, through inlet 222 of fine filter 210, through filter medium 226 of fine filter 210, into annular passage 216, and out wash port 204. Additionally, fluid may also flow in parallel from wash chamber 106, through coarse filter 208, into annular passage 216, and out wash port 204. By contrast, during a drain cycle of the exemplary dishwasher appliance 100, the normal flow direction may be modified such that fluid from wash chamber 106 flows in parallel through inlet 222 of fine filter 210, through chamber 236, and out drain port 206, as well as through coarse filter 208, into annular passage 216, and out drain port 206. Notably, in certain exemplary embodiments, a bottom end 238 of annular passage 216 along the axial direction A may also be in fluid communication with drain port 206.

It should be appreciated, however, that in other exemplary embodiments, filter assembly 100 may have any other suitable configuration. For example, in other exemplary embodiments, wash port 204 and/or drain port 206 may be positioned at any other suitable location in filter assembly 100.

Referring still to FIGS. 3 and 4, and as previously stated, filter assembly 200 further includes backflow device 202, or backflow plate, positioned within fine filter 210. More particularly, backflow device 202 is positioned downstream from and adjacent to inlet 222 of fine filter 210 relative to the normal flow direction. Backflow device 202 is movable relative to inlet 222 of fine filter 210 between an open position, as is shown in FIG. 3, and a closed position as is shown in FIG. 4. Backflow device 202 is configured to allow fluid flow through inlet 222 of fine filter 210 when in the open position and to prevent fluid flow through inlet 222 of fine filter 210 when in the closed position. As will be explained in greater detail below, backflow device 202 is configured to be automatically moved to the closed position in response to a fluid flow in a direction opposite of the normal flow direction.

For the exemplary embodiment depicted, backflow device 202 is movable along the axial direction A between the open position and the closed position. More particularly, fine filter 210 includes a shaft 240 extending along the axial direction A from a center 242 of inlet 222 towards bottom end 232 of fine filter 210. Additionally, backflow device defines a center opening 244 at a center of backflow device 202. Backflow device 202 is slidably mounted, or slidably attached, to inlet 222 of fine filter 210 by positioning center opening 244 of backflow device 202 over shaft 240 of fine filter 210. As depicted, shaft 240 is comprised of a pair of axially extending legs 248, each defining a lip member 250 extending outwardly along the radial direction R at an axial end 252. Legs 248 and lip members 250 may allow the backflow device 202, or more particularly the center opening 244 of backflow device 202, to be "snapped-on" to shaft 240 and slidably attached to shaft 240. It should be appreciated, however, that in other exemplary embodiments, any other suitable mechanism may be provided for attaching backflow device 202 to fine filter 210. For example, in other exemplary embodiments, axial end 252 of shaft 240 may instead be threaded with, e.g., a bolt attached thereto such that backflow device 202 remains slidably attached to shaft 240.

Referring still to FIGS. 3 and 4, fine filter 210 further includes one or more ribs 254 extending towards bottom end 232 of fine filter 210 along the axial direction A from a radially outer portion of inlet 222 of fine filter 210. Similarly, the backflow device 202 defines one or more slots 256 into which the one or more ribs 254 are received. For the embodiment depicted, fine filter 210 includes a plurality of ribs 254 spaced about the circumferential direction C, and the backflow device 202 similarly defines a plurality of slots 256 also spaced about the circumferential direction C. The one or more ribs 254 received into the one or more slots 256 may prevent the backflow device 202 from moving along the circumferential direction C relative to the fine filter 210. Accordingly, the backflow device 202 may maintain a consistent orientation relative to inlet 222 of fine filter 210 when moving between the open position (FIG. 3) in the closed position (FIG. 4). It should be appreciated, however, that in other exemplary embodiments, the filter assembly 200 may include any other suitable configuration for maintaining backflow device 202 at a constant orientation relative to inlet 222 of fine filter 210. For example, in other embodiments, shaft 240 may include features that interact with corresponding features in opening 244 of backflow device 202.

Referring now to FIGS. 5 and 6, perspective views are provided of exemplary fine filter 210 of exemplary filter assembly 200 of FIGS. 3 and 4. More particularly, FIG. 5 provides a perspective view of top end 228 of fine filter 210, and FIG. 6 provides a perspective view of bottom end 232 of fine filter 210. Notably, FIG. 6 is depicted without filter medium 226 for clarity.

Inlet 222 of fine filter 210 defines one or more openings 224 allowing for a flow of fluid therethrough, and includes a surface 258 extending between and around the one or more openings 224 of inlet 222. Similarly, backflow device 202 defines one or more openings 260, and includes a surface 262 extending between and around the one or more openings 260 of backflow device 202. More particularly, for the embodiment depicted, inlet 222 defines eight openings 224 evenly and circumferentially spaced about center 242 of inlet 222, and backflow device 202 similarly defines eight openings 260 evenly and circumferentially spaced about center opening 244 of backflow device 202. However, in other exemplary embodiments, inlet 222 and backflow device 202 may define any other suitable number of openings 224, 260 having any suitable size and/or configuration.

When backflow device 202 is in the closed position, the one or more openings 260 of backflow device 202 define a non-overlapping relationship with each of the one or more openings 224 of inlet 222 of fine filter 210 (see also FIG. 4). More particularly, openings 260 in backflow device 202 allow fluid to flow in the normal flow direction from the one or more openings 224 in inlet 222 into compartment 236 of fine filter 210. However, due to the non-overlapping relationship of the respective openings 224, 260 in inlet 222 and backflow device 202, when the flow of fluid is reversed through fine filter 210, the backflow device 202 prevents a flow of fluid through inlet 222 of fine filter 210. For example, when the flow of fluid is reversed through fine filter 210, the backflow device 202 is automatically moved upward along the axial direction A by such flow such that surface 262 of backflow device 202 extends over and covers each of the one or more openings 224 in inlet 222.

In certain exemplary aspects, referring also back to FIG. 2, dishwasher appliance 100 defines a circulation assembly 152 for circulating wash fluid during, e.g., a wash cycle. Circulation assembly 152 includes wash pump 154 for pressurizing wash fluid and providing such wash fluid to spray assemblies 144, 148, 150 via one or more fluid conduits (not labeled). However, at the end of a wash cycle, wash pump 154 may deactivate and allow fluid remaining in the one or more fluid conduits, or "back wash" fluid, to travel back through wash pump 154 and into wash port 204 of filter assembly 200. The back wash fluid may pass through filter medium 226 of fine filter 210 and flow towards filter inlet 222. Although a small portion of back wash fluid passing through filter medium 226 may help clean filter medium 226, if the back wash fluid were to continue to flow in a direction opposite the normal flow direction and through fine filter 210, the back wash fluid may carry debris and other particles contained within compartment 236 and leave such debris and other particles deposited within wash chamber 106. Accordingly, backflow device 202 is provided to prevent such a reversed flow of back wash fluid through fine filter 210. More specifically, the exemplary backflow device 202 is configured such that it automatically moves with the back wash fluid upwards along the axial direction A into the closed position to prevent such a reversed flow of back wash fluid through fine filter 210 into, e.g., a wash compartment 106 of the exemplary dishwasher appliance 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwasher appliance defining a vertical direction, comprising:

a tub defining a wash chamber;
a sump positioned at a bottom portion of the tub along the vertical direction;
a filter assembly disposed within the sump, the filter assembly comprising
  a first filter extending substantially along the horizontal direction;
  a second filter defining an inlet and extending substantially along the vertical direction, the inlet of the second filter defining one or more openings, the second filter further defining a top end along the vertical direction with the inlet positioned at the top end, wherein the second filter further includes one or more ribs extending along the vertical direction and a shaft extending along the vertical direction away from the inlet; and
  a backflow device positioned within the second filter and slidably attached to the second filter, the backflow device moveable relative to the inlet of the second filter between an open position and a closed position, the backflow device allowing fluid flow through the inlet of the second filter when in the open position and preventing fluid flow through the inlet of the second filter when in the closed position, wherein the backflow device defines one or more slots into which the one or more ribs are received and further defines an opening slidably attached to the shaft of the second filter;
  wherein the backflow device defines one or more flow openings, and wherein the one or more flow openings of the backflow device define a non-overlapping relationship with each of the one or more openings of the inlet of the second filter when the backflow device is in the closed position.

2. The dishwasher appliance of claim 1, wherein the filter assembly defines a normal flow direction in which fluid flows through the second filter from the inlet through a filter medium, wherein the backflow device is configured to automatically move to the closed position in response to a reverse of the normal flow direction.

3. The dishwasher appliance of claim 1, wherein the backflow device closes the one or more openings defined by the inlet of the second filter when in the closed position.

4. The dishwasher appliance of claim 1, wherein the backflow device is movable along the vertical direction between the open position and the closed position.

5. The dishwasher appliance of claim 1, wherein the filter assembly further defines a circumferential direction, wherein the one or more ribs received into the one or more slots prevent the backflow device from moving along the circumferential direction relative to the second filter.

6. The dishwasher appliance of claim 1, wherein the first filter is a coarse filter extending substantially along a horizontal direction, and wherein the second filter is a fine filter extending substantially along the vertical direction.

7. A filter assembly for a dishwasher appliance defining a radial direction and an axial direction, the axial direction being parallel to a vertical direction of the dishwasher appliance, the filter assembly comprising:
  a first filter extending substantially along the radial direction;
  a second filter defining an inlet and extending substantially along the axial direction, the inlet of the second filter defining one or more openings, the second filter further defining a top end along the axial direction with the inlet positioned at the top end, wherein the second filter further includes one or more ribs extending along the axial direction and a shaft extending along the axial direction away from the inlet; and
  a backflow device positioned within the second filter and slidably attached to the second filter, the backflow device moveable relative to the inlet of the second filter between an open position and a closed position, the backflow device allowing fluid flow through the inlet of the second filter when in the open position and preventing fluid flow through the inlet of the second filter when in the closed position, wherein the backflow device defines one or more slots into which the one or more ribs are received and further defines an opening slidably attached to the shaft of the second filter;
  wherein the backflow device defines one or more flow openings, and wherein the one or more flow openings of the backflow device define a non-overlapping relationship with each of the one or more openings of the inlet of the second filter when the backflow device is in the closed position.

8. The filter assembly of claim 7, wherein the filter assembly defines a normal flow direction in which fluid flows through the second filter from the inlet through a filter medium, wherein the backflow device is configured to automatically move to the closed position in response to a reverse of the normal flow direction.

9. The filter assembly of claim 7, wherein the backflow device closes the one or more openings defined by the inlet of the second filter when in the closed position.

10. The filter assembly of claim 7, wherein the backflow device is movable along the axial direction between the open position and the closed position.

11. The filter assembly of claim 7, wherein the filter assembly further defines a circumferential direction, wherein the one or more ribs received into the one or more slots prevent the backflow device from moving along the circumferential direction relative to the second filter.

12. The filter assembly of claim 7, wherein the filter assembly defines a normal flow direction in which fluid flows through the second filter from the inlet to an exit, and wherein the backflow device is positioned downstream from and adjacent to the inlet of the second filter relative to the normal flow direction.

13. The filter assembly of claim 7, wherein the shaft extends from the top end of the second filter along the axial direction away from the top end of the second filter.

14. The filter assembly of claim 7, wherein the opening of the backflow device positioned over the shaft of the second filter is a center opening.

* * * * *